(12) United States Patent
Soundararajan et al.

(10) Patent No.: US 12,153,925 B2
(45) Date of Patent: Nov. 26, 2024

(54) ALTERNATE PATH DECODE FOR HARD-TO-PREDICT BRANCH

(71) Applicant: Intel Corporation, Santa Clara, CA (US)

(72) Inventors: Niranjan Soundararajan, Bengaluru (IN); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 17/130,706

(22) Filed: Dec. 22, 2020

(65) Prior Publication Data

US 2022/0197650 A1   Jun. 23, 2022

(51) Int. Cl.
*G06F 9/30* (2018.01)
*G06F 9/38* (2018.01)

(52) U.S. Cl.
CPC ...... *G06F 9/30145* (2013.01); *G06F 9/30058* (2013.01); *G06F 9/3804* (2013.01); *G06F 9/3842* (2013.01); *G06F 9/38585* (2023.08)

(58) Field of Classification Search
CPC .......................... G06F 9/30145; G06F 9/30058
See application file for complete search history.

(56) References Cited

U.S. PATENT DOCUMENTS

| | | | |
|---|---|---|---|
| 5,860,017 A | 1/1999 | Sharangpani et al. | |
| 6,269,438 B1 | 7/2001 | Chang | |
| 6,374,351 B2 | 4/2002 | Tremblay | |
| 2008/0162905 A1 | 7/2008 | Luick | |
| 2009/0172359 A1 | 7/2009 | Shen et al. | |
| 2010/0262813 A1 | 10/2010 | Brown et al. | |
| 2019/0012174 A1 | 1/2019 | Grant | |
| 2020/0004542 A1* | 1/2020 | Chauhan | G06F 9/30058 |
| 2020/0026520 A1 | 1/2020 | Ward et al. | |
| 2020/0310813 A1* | 10/2020 | Sadasivam | G06F 9/3806 |
| 2021/0124586 A1* | 4/2021 | Bouzguarrou | G06F 9/30145 |
| 2021/0326139 A1* | 10/2021 | Gupta | G06F 9/3867 |

OTHER PUBLICATIONS

Extended European Search Report from European Patent Application No. 21198625.2 notified Mar. 28, 2022, 13 pgs.

(Continued)

*Primary Examiner* — Michael J Metzger
(74) *Attorney, Agent, or Firm* — Essential Patents Group, LLP

(57) ABSTRACT

An embodiment of an integrated circuit may comprise a core, a front end unit coupled to the core to decode one or more instruction wherein the front end unit includes a first decode path, a second decode path, and circuitry to: predict a taken branch of a conditional branch instruction of the one or more instructions, decode a predicted path of the taken branch on the first decode path, determine if the conditional branch instruction corresponds to a hard-to-predict conditional branch instruction and if the second decode path is available and, if so determined, decode an alternate path of a not-taken branch of the hard-to-predict conditional branch instruction on the second decode path. Other embodiments are disclosed and claimed.

18 Claims, 14 Drawing Sheets

(56) References Cited

OTHER PUBLICATIONS

August, David I. et al., "A Framework for Balancing Control Flow and Predication", Proceedings of 30th Annual International Symposium on Microarchitecture, Dec. 1997, 12 pgs.
Chang, Po-Yung et al., "Using Predicated Execution to Improve the Performance of Dynamically Scheduled Machine with Speculative Execution", PACT 1995, 10 pgs.
Mahlke, Scott A. et al., "Effective Compiler Support for Predicated Execution Using the Hyperblock", Proceedings of the 25th Annual International Symposium on Microarchitecture, MICRO 25, 1992, 10 pgs.
Yasin, Ahmad, "A Top-Down Method for Performance Analysis and Counters Architecture", 2014 IEEE International Symposium on Performance Analysis of Systems and Software (ISPASS), 10 pgs.
Office Action from European Patent Application No. 21198625.2 notified Jul. 8, 2024, 7 pgs.

\* cited by examiner

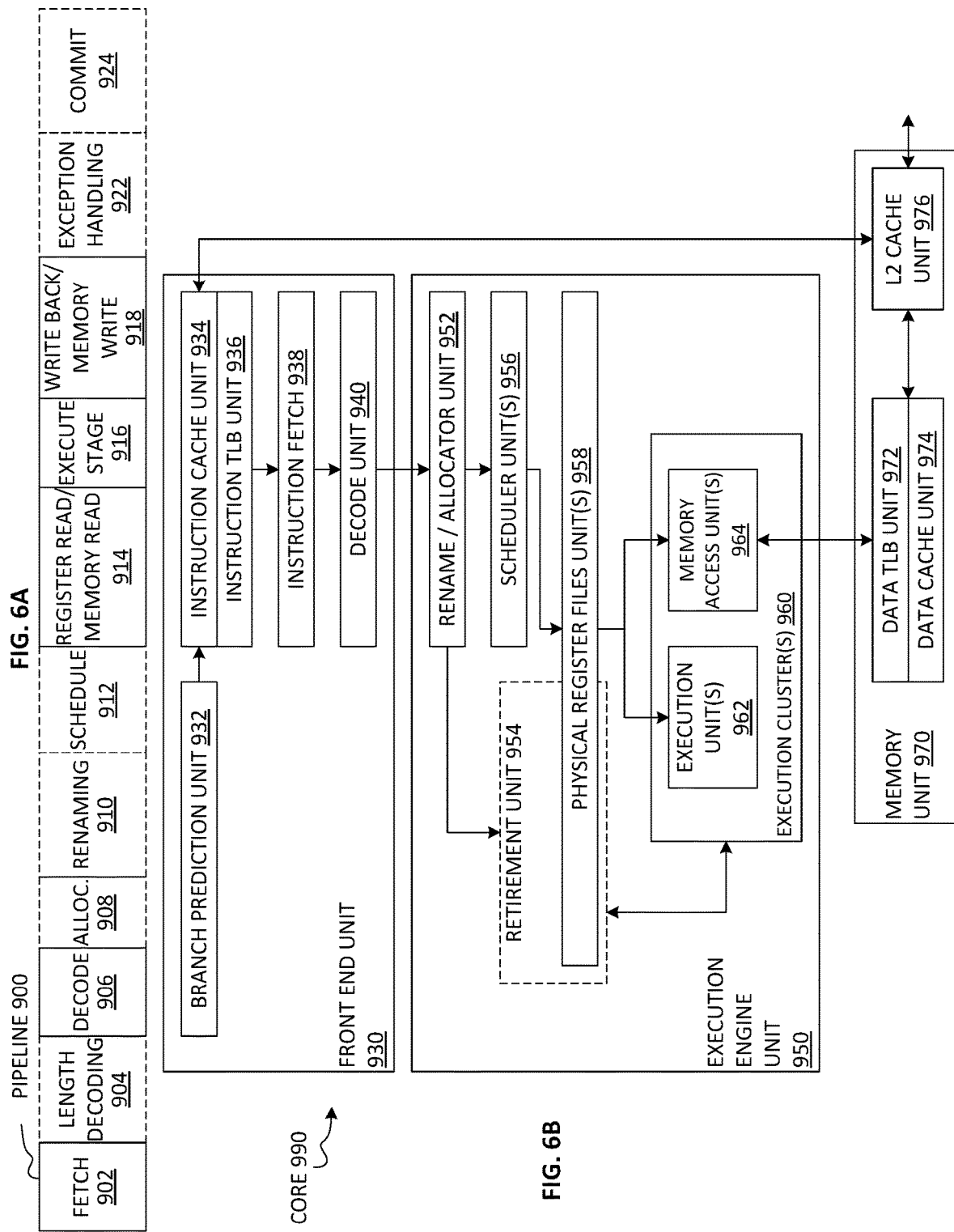

ALTERNATE PATH DECODE FOR HARD-TO-PREDICT BRANCH

BACKGROUND

1. Technical Field

This disclosure generally relates to processor technology, instruction decode technology, and speculative decode technology.

2. Background Art

Some central processor unit (CPU) cores may utilize speculative execution to avoid pipeline stalls and achieve better performance, which allows execution to continue without having to wait for the architectural resolution of a branch target. Branch prediction technology utilizes a digital circuit that guesses which way a branch will go before the branch instruction is executed. Correct predictions/guesses improve the flow in the instruction pipeline. In general, a branch prediction for a conditional branch may be understood as a prediction for the branch as "taken" vs. "not-taken." A branch prediction unit (BPU) may support speculative execution by providing branch prediction for a frontend of a CPU based on the branch instruction pointer (IP), branch type, and the control flow history (also referred as branch history) prior to the prediction point.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
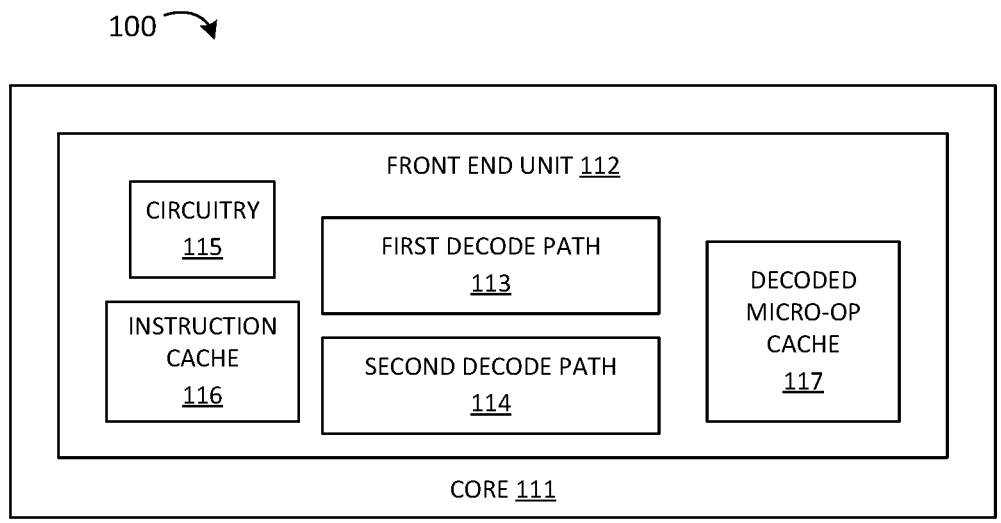
FIG. 1 is a block diagram of an example of an integrated circuit according to an embodiment.

Embodiments discussed herein variously provide techniques and mechanisms for speculative decode of an alternate branch for hard-to-predict (H2P) branches. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to decode instructions.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As pipeline width and depth increases in an out-of-order processor core, the penalty per branch misprediction increases. The penalty (e.g., which may also be referred to as a misprediction cost) may be exacerbated when the branch misprediction is followed by undesirable core front-end events such as micro-operation (micro-op) cache misses, which may lead to higher latency (e.g., and bubbles) in providing correct path micro-ops to the core's back-end. For example, if the micro-op cache misses, a legacy decode path (e.g., MITE) may have to fetch and decode the instructions on demand, and then push the instructions to the back-end for execution. In some cores, the MITE decode may have a longer latency, lower bandwidth and higher power utilization as compared to accessing the micro-op cache, and therefore such a sequence of events may worsen CPU front-end bottlenecks on a large category of workloads.

Branch predication may refer to technology that enables both paths of conditional branches to be simultaneously fetched, decoded and allocated to the back-end. Based on the branch execution, instructions from one of the paths is picked while the other is removed from the pipeline. Because branch predication leads to both paths getting allocated to the back-end, extra resources in the processor core are speculatively reserved which may globally lower performance indicators such as instructions per cycle (IPC). Efficient branch predication often also requires compiler support to provide hints to minimize the branches that need to be predicated.

In some processor cores, a decode path for the predicted taken branch may be the primary decode path for providing instructions into the back-end. For example, the primary decoded instruction path may be more highly utilized (e.g., greater than about 80% in many scenarios) as compared to a legacy decode path (e.g., such as the MITE path). During these periods, the legacy decode path may be available and may have free cycles. Some embodiments may provide technology to opportunistically utilize the legacy decode path to fetch and decode instructions from alternate paths of hard-to-predict (H2P) branches early before the alternate path may be actually required (e.g., to be utilized in the event of a future branch misprediction). For example, the alternate path may refer to a program path not predicted as taken by the branch predictor. Advantageously, some embodiments may help hide the latency of fetching and decoding these instructions after the branch is detected to have been mispredicted. For example, some embodiments may effectively and speculatively utilize the MITE path to mitigate CPU front-end bubbles (e.g., latency penalties) for a processor core. In some embodiments, micro-op cache entries may be allocated only based on availability which may result in better utilization of scarce CPU resources as compared to branch predication technology. Moreover, some embodiments may be effective with no compiler support.

With reference to FIG. 1, an embodiment of an integrated circuit 100 may include a core 111, and a front end unit 112 coupled to the core 111 to decode one or more instructions. The front end unit 112 may include a first decode path 113 (e.g., a primary decode path that caches previously seen instructions), a second decode path 114 (e.g., a legacy decode path to decode newly seen instructions), and circuitry 115 to predict a taken branch of a conditional branch instruction of the one or more instructions, send instructions of the predicted path of the taken branch from the first decoded path 113, determine if the conditional branch instruction corresponds to a hard-to-predict (H2P) conditional branch instruction and if the second decode path 114 is available and, if so determined, decode an alternate path of a not-taken branch of the H2P conditional branch instruction on the second decode path 114. For example, the circuitry 115 may be configured to decode the alternate path of the H2P conditional branch instruction on free cycles of the second decode path 114. In some embodiments, the front end unit 112 may further include an instruction cache 116, and the circuitry 115 may be configured to further to decode the alternate path of the H2P conditional branch instruction on the second decode path 114 only if the H2P conditional branch instruction hits on cache lines in the instruction cache 116. In some embodiments, the circuitry 115 may also be configured to determine if the one or more instructions includes an instruction set architecture (ISA) extension to indicate a H2P conditional branch instruction, and, if so determined, determine whether the one or more instructions includes the H2P conditional branch instruction based on an extension bit of the ISA extension.

In some embodiments, the front end unit 112 may further include a decoded micro-operation (micro-op) cache 117 and the circuitry 115 may be further configured to assign a set of ways to the decode micro-op cache 117, reserve a subset of the set of ways for decoded instructions from the alternate path, and capture the decoded instructions from the alternate path in the reserved subset of ways. For example, the circuitry 115 may also be configured to invalidate entries in the reserved subset of ways as soon as the predicted path is determined to be correct, and/or to provide the decoded instructions from the reserved subset of ways to a back end unit if the predicted path is determined to be incorrect.

Figure 11:
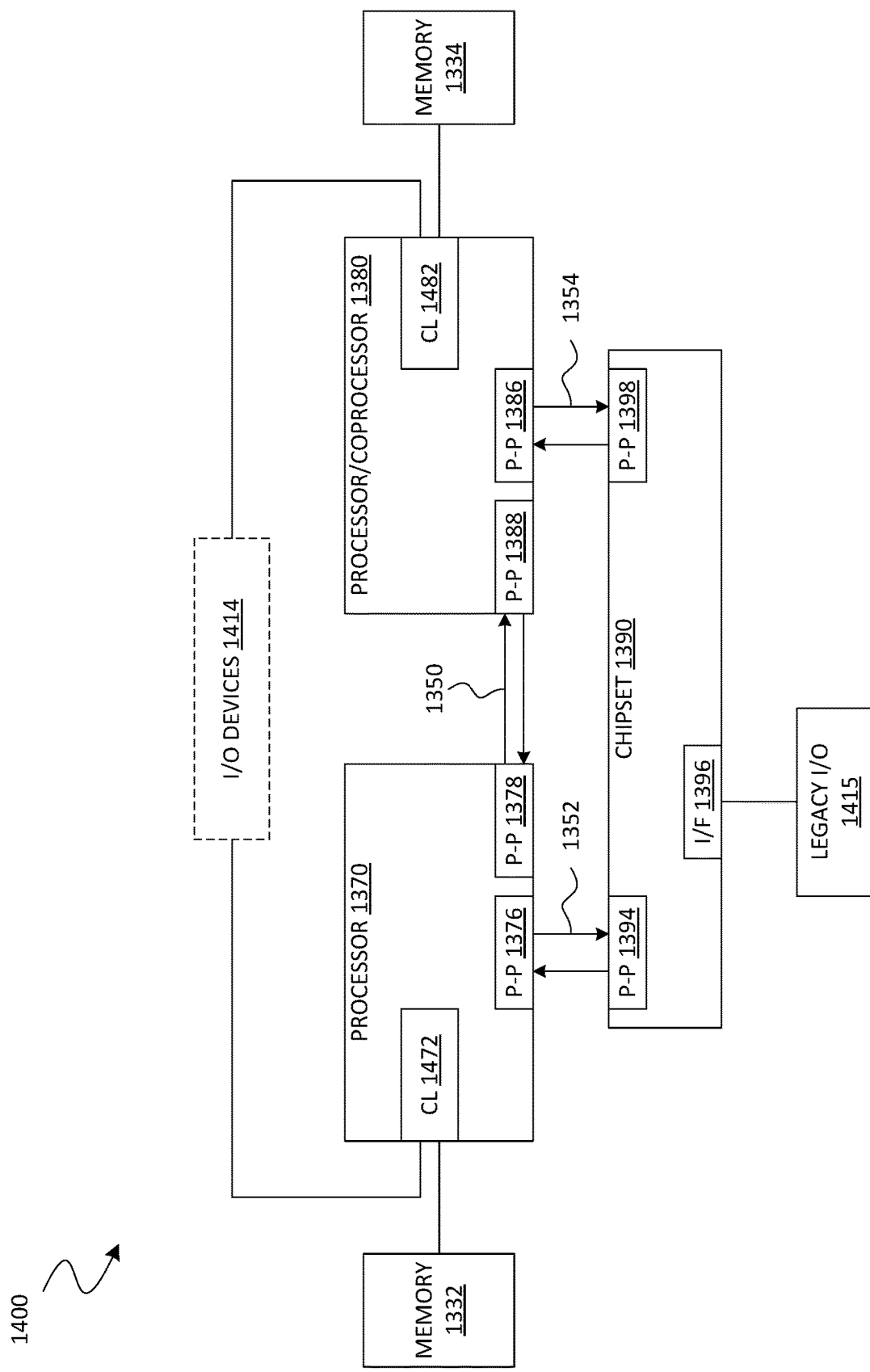
Figure 12:
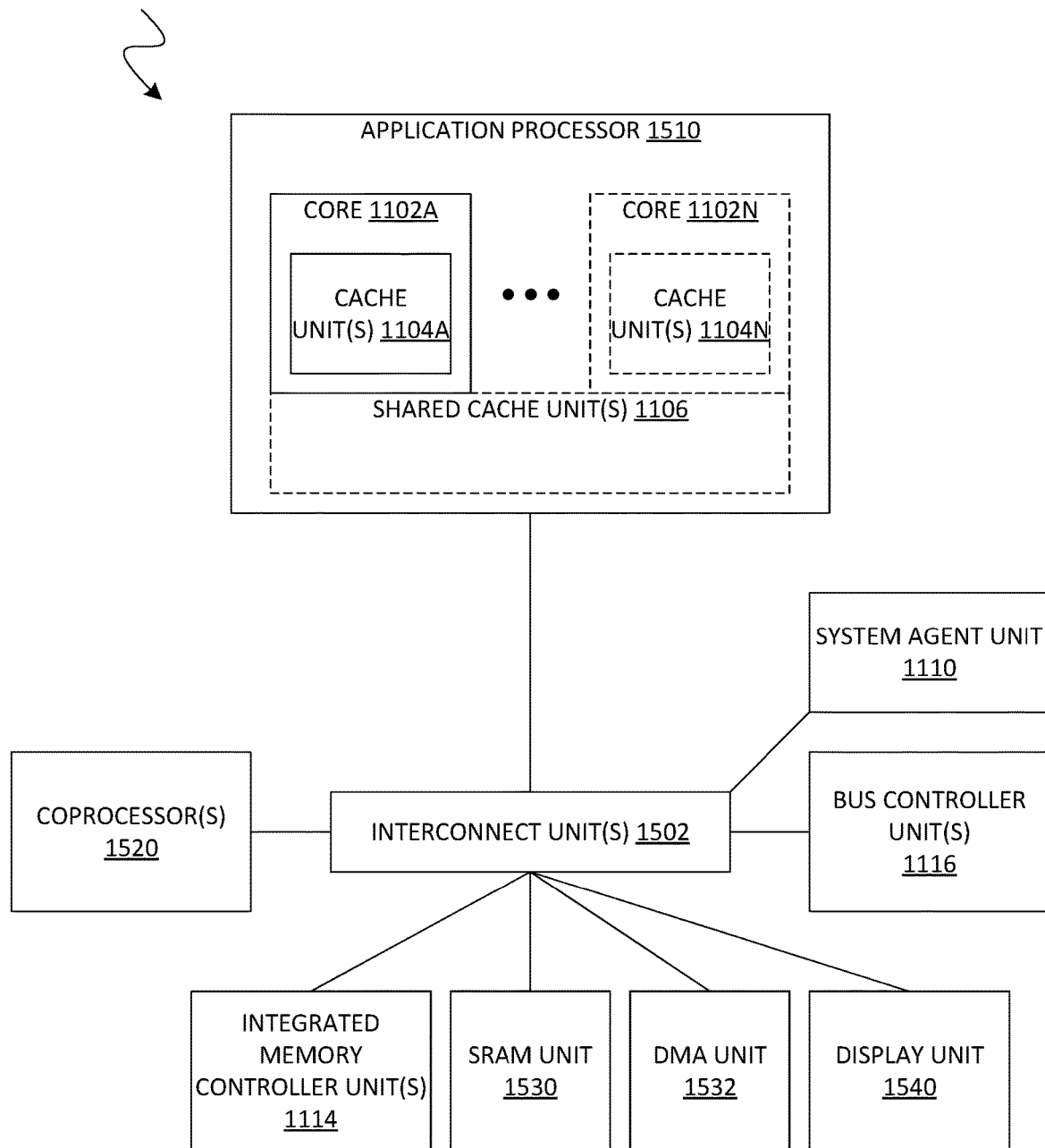
Figure 13:
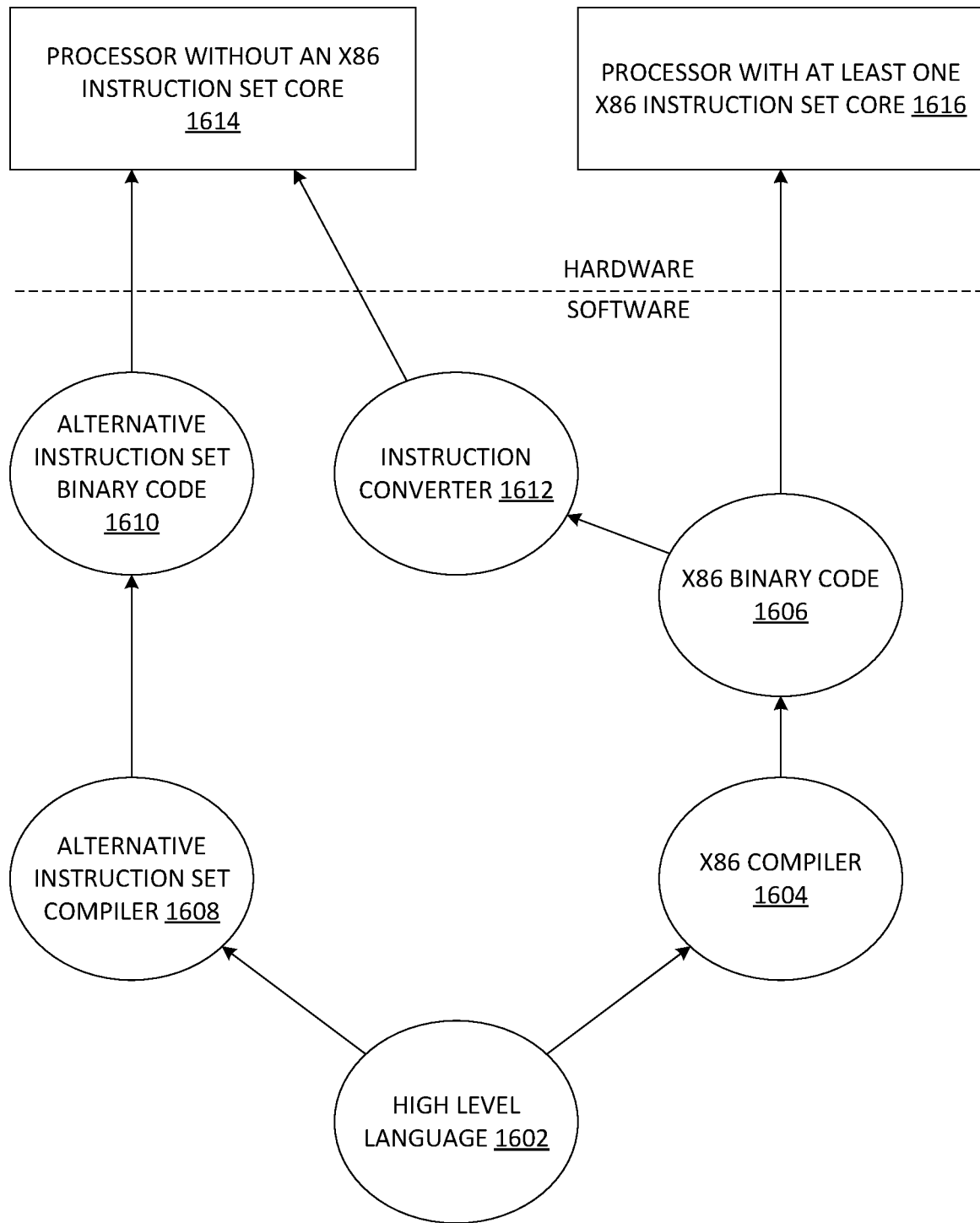
FIG. 13 is a block diagram contrasting the use of a software instruction converter to convert binary instructions in a source instruction set to binary instructions in a target instruction set according to embodiments of the invention.

Embodiments of the front end unit 112, the first decode path 113, the second decode path 114, the circuitry 115, the instruction cache 116, and/or the decoded micro-op cache 117 may be incorporated in a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/ coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the circuitry 115, the instruction cache 116, and/or the decoded micro-op cache 117 may be incorporated in the front end unit 930 (FIG. 11B).

Figure 2A:
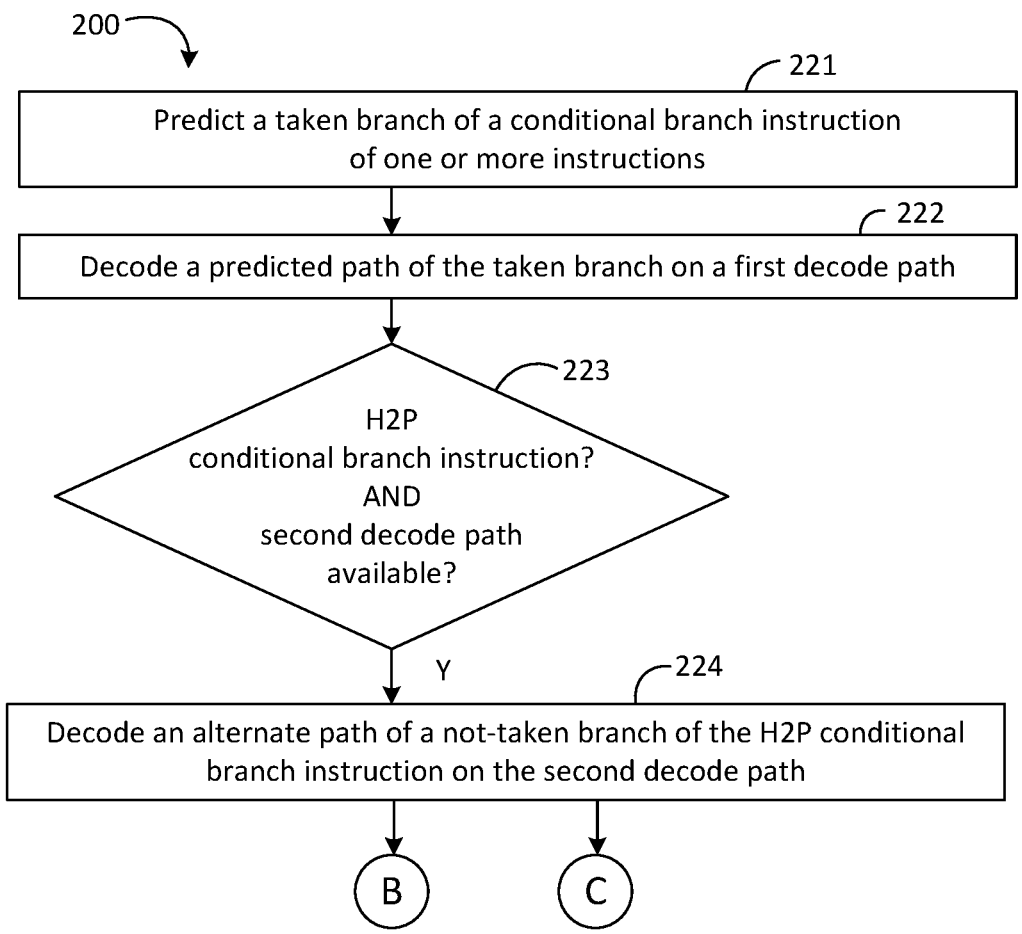
FIGS. 2A to 2C are flow diagrams of an example of a method according to an embodiment.
Figure 2B:
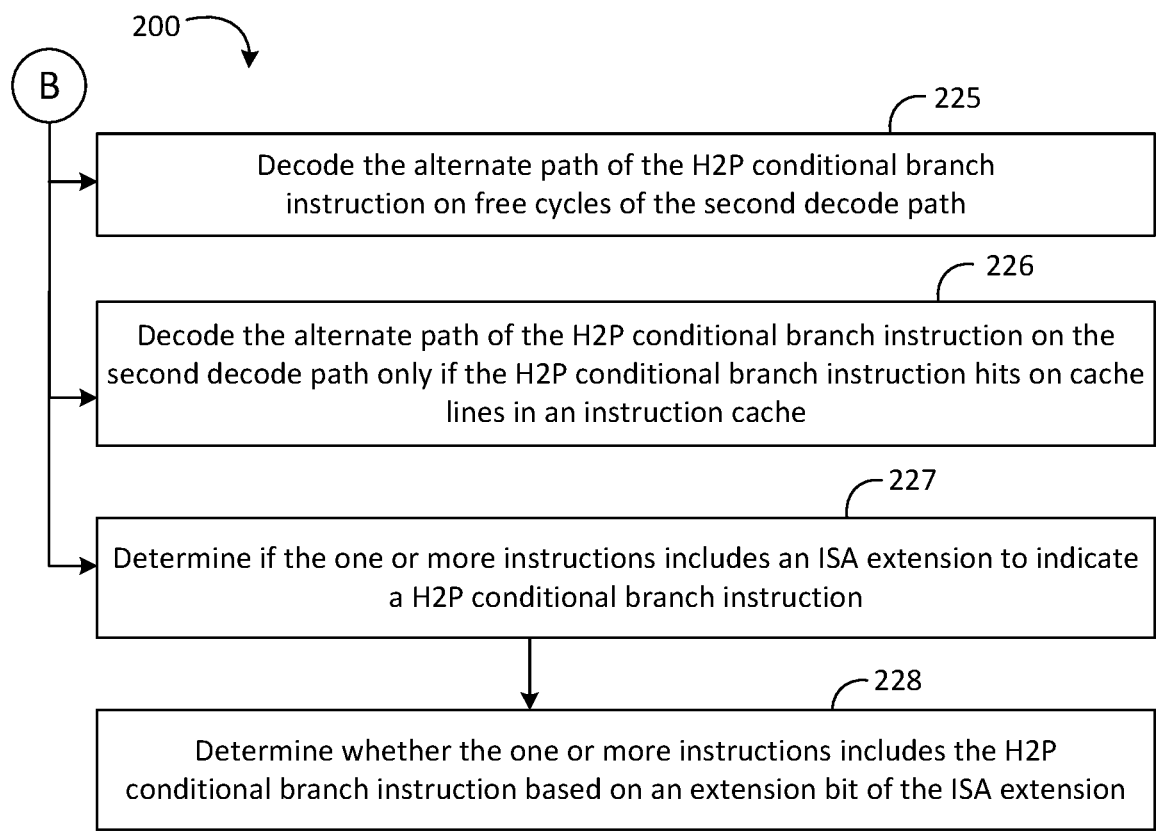
Figure 2C:
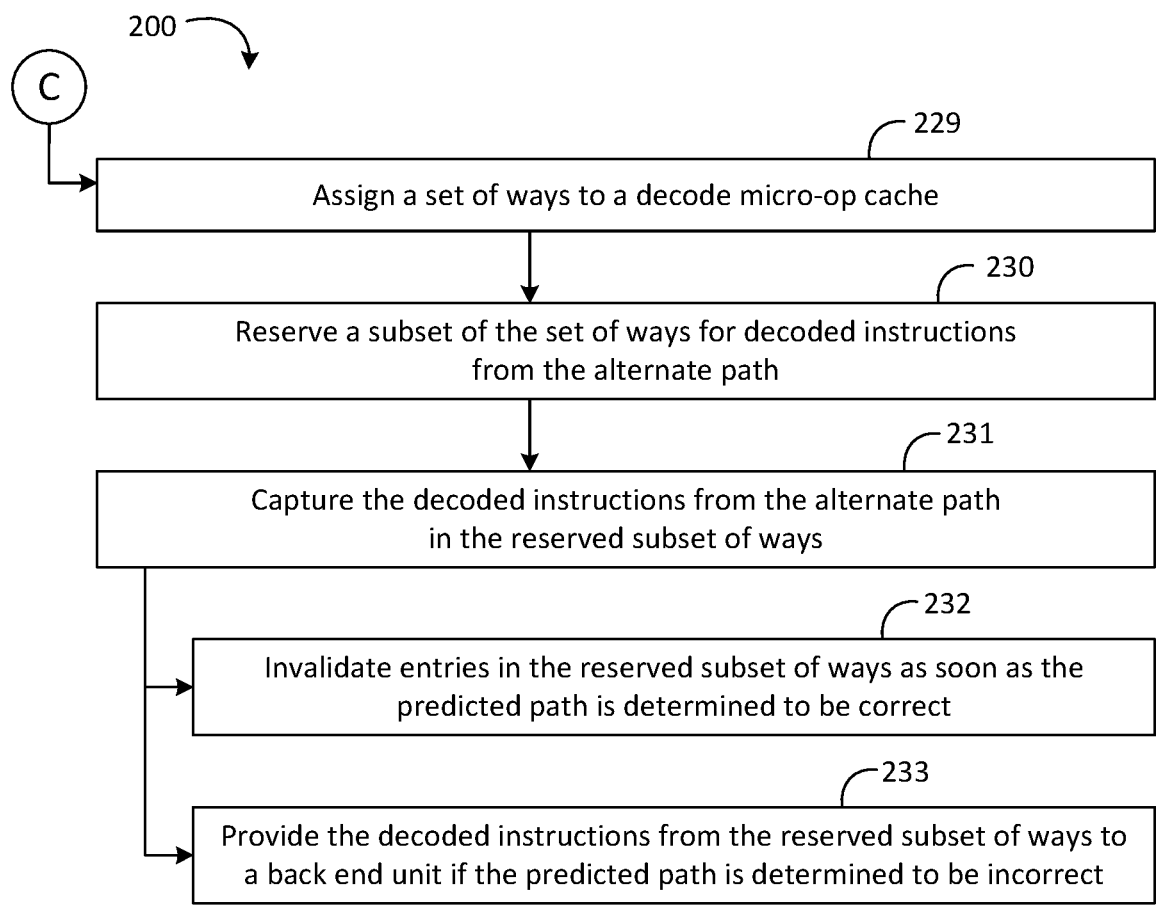

With reference to FIGS. 2A to 2C, an embodiment of a method 200 may include predicting a taken branch of a conditional branch instruction of one or more instructions at box 221, decoding a predicted path of the taken branch on a first decode path at box 222, determining if the conditional branch instruction corresponds to a H2P conditional branch instruction and if a second decode path is available at box 223, and, if so determined, decoding an alternate path of a not-taken branch of the H2P conditional branch instruction on the second decode path at box 224. For example, the method 200 may include decoding the alternate path of the H2P conditional branch instruction on free cycles of the second decode path at box 225. The method 200 may also include decoding the alternate path of the H2P conditional branch instruction on the second decode path only if the H2P conditional branch instruction hits on cache lines in an instruction cache at box 226. Some embodiments of the method 200 may further include determining if the one or more instructions includes an ISA extension to indicate a H2P conditional branch instruction at box 227, and, if so determined, determining whether the one or more instructions includes the H2P conditional branch instruction based on an extension bit of the ISA extension at box 228.

Some embodiments of the method 200 may further include assigning a set of ways to a decode micro-op cache at box 229, reserving a subset of the set of ways for decoded instructions from the alternate path at box 230, and capturing the decoded instructions from the alternate path in the reserved subset of ways at box 231. The method 200 may also include invalidating entries in the reserved subset of ways as soon as the predicted path is determined to be correct at box 232, and/or providing the decoded instructions from the reserved subset of ways to a back end unit if the predicted path is determined to be incorrect at box 233.

Figure 3:
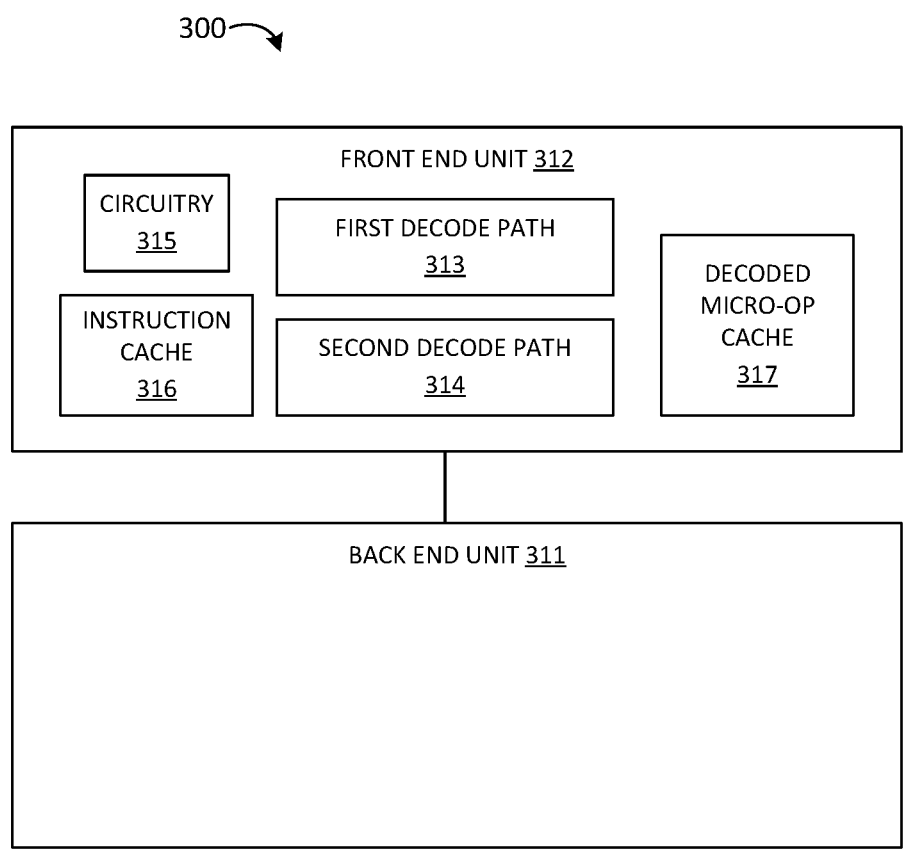
FIG. 3 is a block diagram of an example of an apparatus according to an embodiment.

With reference to FIG. 3, an embodiment of an apparatus 300 may include a back end unit 311 to execute one or more decoded instructions, and a front end unit 312 communicatively coupled to the back end unit 311 to decode one or more instructions. The front end unit 312 may include a first decode path 313, a second decode path 314, and circuitry 315 to predict a taken branch of a conditional branch instruction of the one or more instructions, decode a predicted path of the taken branch on the first decode path 313, determine if the conditional branch instruction corresponds to a H2P conditional branch instruction and if the second decode path 314 is available and, if so determined, decode an alternate path of a not-taken branch of the H2P conditional branch instruction on the second decode path 314. For example, the circuitry 315 may be configured to decode the alternate path of the H2P conditional branch instruction on free cycles of the second decode path 314. In some embodiments, the front end unit 312 may further include an instruction cache 316, and the circuitry 315 may be configured to is further to decode the alternate path of the H2P conditional branch instruction on the second decode path 314 only if the hard-to-predict conditional branch instruction hits on cache lines in the instruction cache 316. In some embodiments, the circuitry 315 may also be configured to determine if the one or more instructions includes an instruction set architecture (ISA) extension to indicate a H2P conditional branch instruction, and, if so determined, determine whether the one or more instructions includes the H2P conditional branch instruction based on an extension bit of the ISA extension.

In some embodiments, the front end unit 312 may further include a decode micro-op cache 317 and the circuitry 315 may be further configured to assign a set of ways to the decode micro-op cache 317, reserve a subset of the set of ways for decoded instructions from the alternate path, and capture the decoded instructions from the alternate path in the reserved subset of ways. For example, the circuitry 315 may also be configured to invalidate entries in the reserved subset of ways as soon as the predicted path is determined to be correct, and/or to provide the decoded instructions from the reserved subset of ways to the back end unit 311 if the predicted path is determined to be incorrect.

Embodiments of the front end unit 312, the first decode path 313, the second decode path 314, the circuitry 315, the instruction cache 316, and/or the decoded micro-op cache 317 may be incorporated in a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/ coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the circuitry 315, the instruction cache 316, and/or the decoded micro-op cache 317 may be incorporated in the front end unit 930 (FIG. 11B).

Some embodiments provide technology for penalty mitigation for dynamic H2P branch instances through speculative fetch and decode of alternate code paths through microarchitectural and ISA extensions. A branch misprediction penalty may lead to an idle out-of-order (OOO) back-end, where the back-end is exposed or stalled until the front-end can provide the correct path instructions. For example, branch mispredictions may result in a pipeline flush and require re-steering from the correct path. To hide the latency of the fetch and decode of the correct path when the micro-op cache misses, some embodiments provide technology to eagerly fetch and decode the alternate path. Some embodiments may monitor and/or detect that the legacy decode path is sufficiently idle so as to not delay the instructions already in the pipeline. In general, a vast majority (e.g., >80%) of the retiring instructions may come from the micro-op cache, which indicate that the legacy decode path is generally idle enough to opportunistically support the eager fetch and decode of the alternate paths of certain dynamic branches.

Instead of performing the speculation for every branch instance (e.g., which may waste resources), some embodiments only target H2P branches. For example, H2P branches may account for a vast majority (e.g., >90%) of the dynamic mispredictions but may correspond to a much smaller percentage (e.g., only between about 13-28%) of the static program counters (PCs). In accordance with some embodiments, for the PCs that correspond to H2P branches, the alternate path is fetched, decoded and stored in the micro-op cache right after the predicted path enters the back-end (e.g., after the predicted path is allocated in an instruction decode queue (IDQ)). If the branch instance was actually predicted correctly, then the speculation was unnecessary and a micro-op cache way storing the alternate path may be invalidated immediately (e.g., enabling re-use of the way). Releasing the micro-op cache way when not needed lowers the pressure on the micro-op cache considerably, while eagerly fetching and decoding the alternate path efficiently hides the fetch and decode latency on a critical pipeline flush initiated by front-end re-steer events.

By eagerly fetching and decoding the instructions on the alternate path of H2P (e.g., sometimes also referred to as "flaky") branches (e.g., in the shadow of other instructions fed from the micro-op cache to the back-end), some embodiments may advantageously mitigate large branch misprediction penalties and energy inefficiencies in an out-of-order processor core with a wide and deep pipeline. In some embodiments, a low-complexity implementation may advantageously improve processor power and performance by storing the prefetched and pre-legacy decode path microops in the micro-op cache and judiciously managing the speculatively acquired resources. For example, some embodiments provide technology with focused intervention to identify and perform the speculation only for certain conditional branches (e.g., H2P, flaky, etc.) which corresponds to a much smaller subset of all the branches in an application. Advantageously, some embodiments may significantly reduce IDQ write bubbles post a branch misprediction (e.g., depending on the instruction cache hit rate), which may directly translate to proportional execution cycles reduction and significant CPU power savings because the back-end would otherwise have been fully stalled and consuming power.

Figure 4:
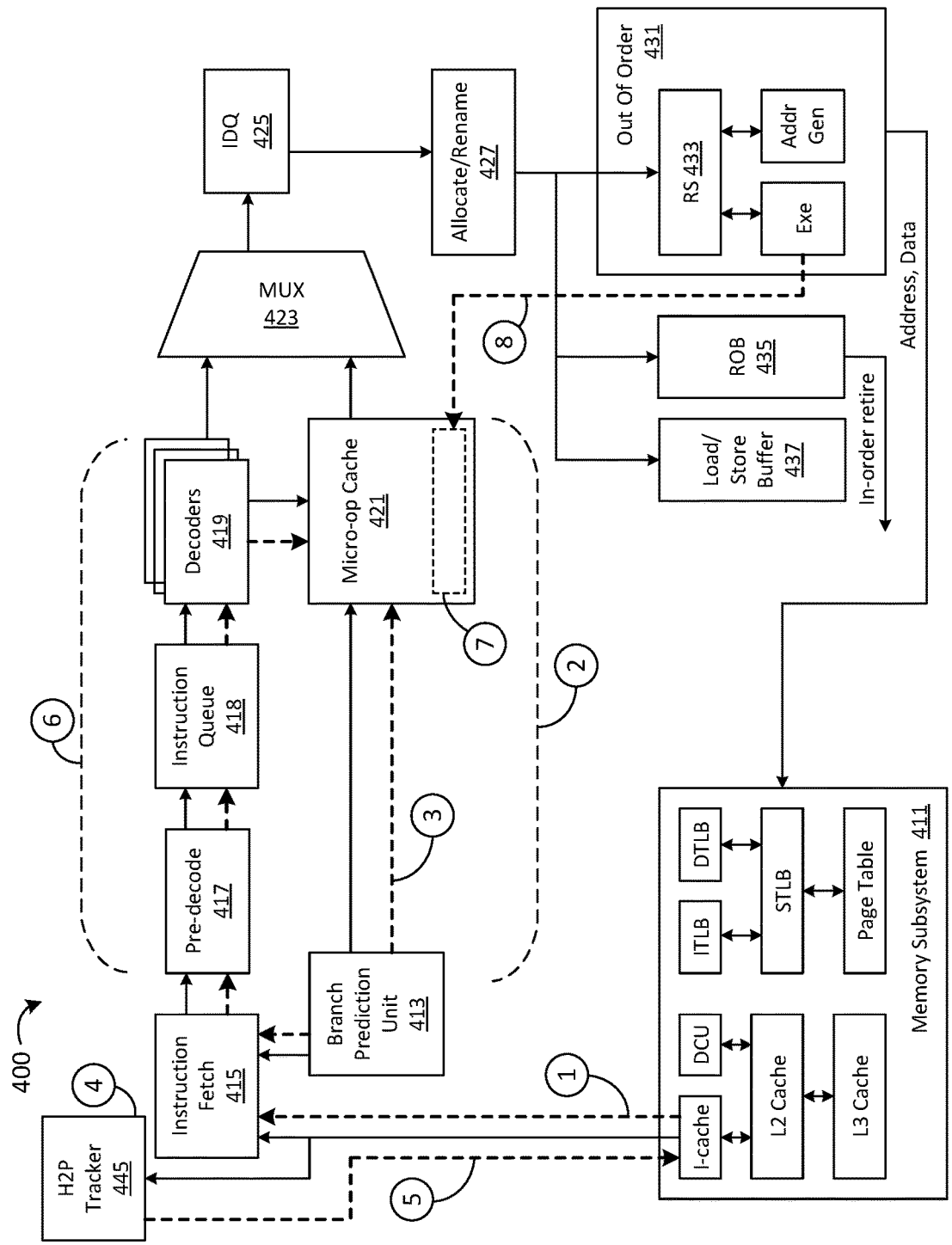
FIG. 4 is a block diagram of an example of an out-of-order processor according to an embodiment.

With reference to FIG. 4, an embodiment of an OOO processor core 400 includes a memory subsystem 411, a BPU 413, an instruction fetch circuit 415, a pre-decode circuit 417, an instruction queue 418, decoders 419, a micro-op cache 421, a mux 423, an IDQ 425, an allocate/ rename circuit 427, an out-of-order core 431, a reservation station (RS) 433, a re-order buffer (ROB) 435, and a load/store buffer 437, connected as shown. The memory subsystem 411 include a L1 instruction cache (I-cache), a L1 data cache (DCU), a L2 cache, a L3 cache, an instruction translation lookaside buffer (ITLB), a data translation lookaside buffer (DTLB), a shared translation lookaside buffer (STLB), and a page table, connected as shown. The OOO core 431 includes a reservation station (RS), an Exe circuit, and a address generation circuit, connected as shown. The microarchitecture of the OOO processor 400 further includes a H2P tracker circuit 445, and other circuitry, to enable eager fetch of an alternate path for H2P branches to hide branch misprediction latency. Any suitable technology may be utilized to identify the H2P branches. For example, the H2P tracker may maintain a small table that tracks the instruction pointers (IPs) of the branches with the most mispredictions.

As shown in FIG. 4, dashed lines are numbered to illustrate an example process flow. At arrow 1, an incoming cache line enters the pipeline from the I-cache. The bracket 2 indicates a primary decode path for the OOO processor 400. For example, the primary decode path corresponds to a cache of the instructions already seen and decoded. At arrow 3, the micro-op cache 421 captures the instructions of the predicted path from the primary decode path. At arrow 4, the H2P tracker 445 identifies that a H2P branch has entered the pipeline and, at arrow 5, the H2P tracker 445 initiates an "early" fetch of instructions from the alternate path. If the I-cache misses on the alternate path, the H2P tracker 445 does not trigger a fetch from lower levels of the cache. Bracket 7 indicates a legacy decode path for the OOO processor 400. For example, the legacy decode path may correspond to an alternate decoded instruction path (e.g., sometimes referred to as a MITE in some processors). If the alternate path hits in the I-cache, the alternate path is sent through the legacy decode path for decode. Because the micro-op cache 421 provides high coverage of the instructions that come from the primary decode path, the legacy decode path generally has sufficient free cycles to decode the alternate paths. The OOO processor 400 may further include circuitry to ensure that the alternate path is decoded only on free cycles of the legacy decode path.

After the fetch and decode of the alternate path, the decoded micro-operations that correspond to the alternate path are stored in the micro-op cache (e.g., a check may be made to determine if the decoded operations are not already present in the micro-op cache 421 to avoid duplication). The micro-op cache 421 may have N ways per set (e.g., in some processor N may be in the range of 8-16). At box 7, some embodiments may reserve only a limited tunable number of ways per set (e.g., about 2-4 ways per set) for the alternate paths. Because the micro-op cache 421 may be a small structure and the BPU 413 may predict with relatively high accuracy, in general, entry utilization for the alternate path may be configured to limit the pressure on micro-op cache 421. At arrow 8, after the branch completes execution and the branch prediction turns out to be correct, the micro-ops corresponding to the alternate path are invalidated. If the branch prediction turns out to be incorrect, the micro-operations cached from the alternate path, cached in the reserved ways in the micro-op cache 421, are provided expeditiously to the back-end. In some embodiments, fetch along the alternate path may be stopped either when the current decoded line cannot be allocated in the micro-op cache 421 or when another H2P branch enters the pipeline.

Embodiments of the OOO processor 400 may utilize the MITE to opportunistically decode instructions early and the decoded instructions are stored in micro-op cache 421 to feed the back-end faster. Both paths of some H2P conditional branches may be deterministic and mispredictions of such H2P branches may dominate an overall performance bottleneck. Advantageously, embodiments of eager early decoding of the alternate path for such H2P branches capture the corresponding decoded micro-operations in the micro-op cache 421 and help to significantly to hide the latency of the branch mispredictions.

Because the micro-op cache 421 may be a small-sized structure, speculative fetch and decode of alternate paths of too many conditional branches may increase the allocation pressure in the micro-op cache 421 and lower its impact (e.g., because the alternate paths are only useful when the branch mispredicts). H2P branches include those conditional branches that often mispredict and result in performance loss. Advantageously, some embodiments identify IPs of H2P branches and decode the corresponding alternate paths only when the identified branch IPs enter the pipeline to speculatively fetch/decode a limited set of mispredicting IPs while providing substantial coverage in the micro-op cache 421 for mispredictions with relatively limited space needed in the micro-op cache 421.

Figure 5A:
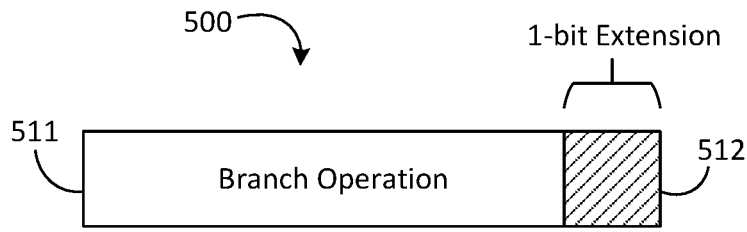
FIG. 5A is an illustrative diagram of an example of a branch instruction according to an embodiment.

With reference to FIG. 5A, an embodiment of a branch instruction 500 includes a branch operation 511 and an ISA extension bit 512. For example, some embodiments may include ISA extensions to fetch and decode the alternate path. In accordance with some embodiments, as described above, tracking H2P branches and fetching the alternate path may be done transparently in hardware. In some embodiments, however, the efficiency of the technique may be enhanced through compiler hints coming via ISA extensions which help to identify the best set of branch PCs to eagerly fetch the alternate path.

Figure 5B:
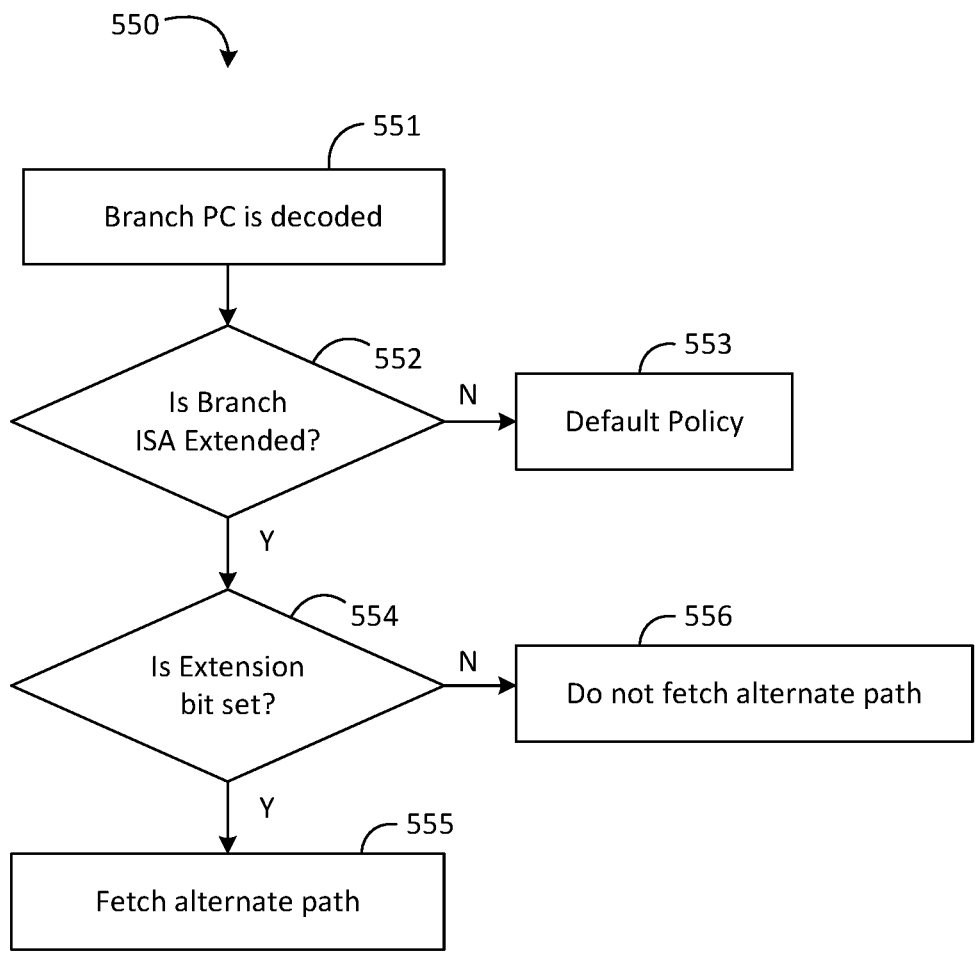
FIG. 5B is a flow diagram of another example of a method according to an embodiment.

With reference to FIG. 5B, an embodiment of a method 550 to identify if alternate paths of specific branches need to be speculatively fetched and decoded starts with decoding a branch program counter at box 551. The method 550 then includes determining if the branch is ISA Extended at box 552 and, if not, applying the default policy at box 553. If the branch is determined to be ISA Extended at box 552, the method 550 may proceed to determining if the Extension bit is set at box 554. If so, the method 550 may proceed to fetching the alternate path at box 555. Otherwise, the method 550 may inhibit fetch of the alternate path at box 556. Advantageously, with simple ISA extensions, the set of branches to speculatively fetch and decode the alternate path for may be narrowed down to better or optimally use the resources. Prior profiling information may be used by a compiler to set the extension bits to enhance the allocation into the different tables.

Advantageously, some embodiments significantly reduce IDQ write bubbles (e.g., a reduction in the number of cycles that the IDQ has to wait for instructions to reach the IDQ after a branch misprediction), with more reduction provided when the I-cache hit rate is higher (which may be a function of size, quality, aggressiveness, etc. of code prefetchers). Reduction in exposed IDQ write bubbles post branch misprediction may directly translate to performance gains (e.g., lowering the retirement bubbles which in turn results in proportional IPC gains).

While some embodiments of speculatively fetching and decoding of the alternate path to hide branch misprediction latency is applied only for instances that hit in the I-cache, other embodiments cover cases when the alternate path misses in the I-cache. Depending on when the H2P branch resolves, for example, the speculative fetch and decode of an alternate path that missed in the I-cache may be completed or may otherwise help cover part of the misprediction penalty. Accordingly, embodiments may provide performance gains even if the alternate path misses the I-cache.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/ execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 6B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7A:
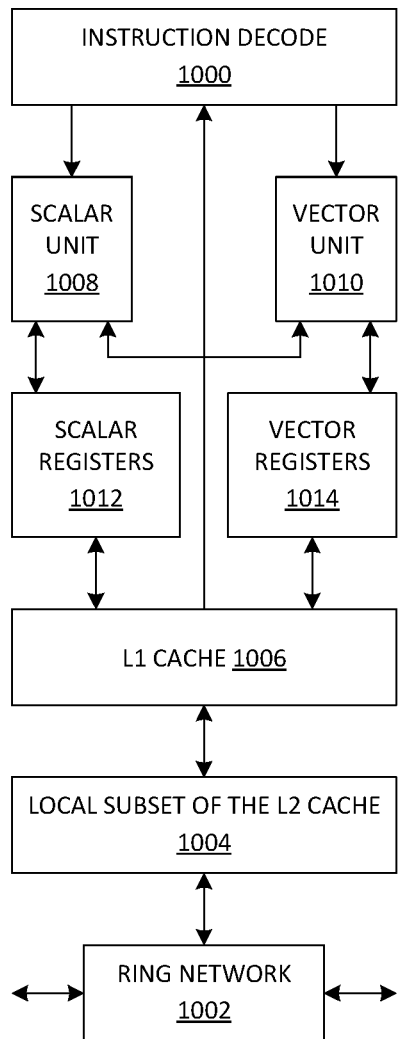
FIGS. 7A-B illustrate a block diagram of a more specific exemplary in-order core architecture, which core would be one of several logic blocks (including other cores of the same type and/or different types) in a chip.
Figure 7B:
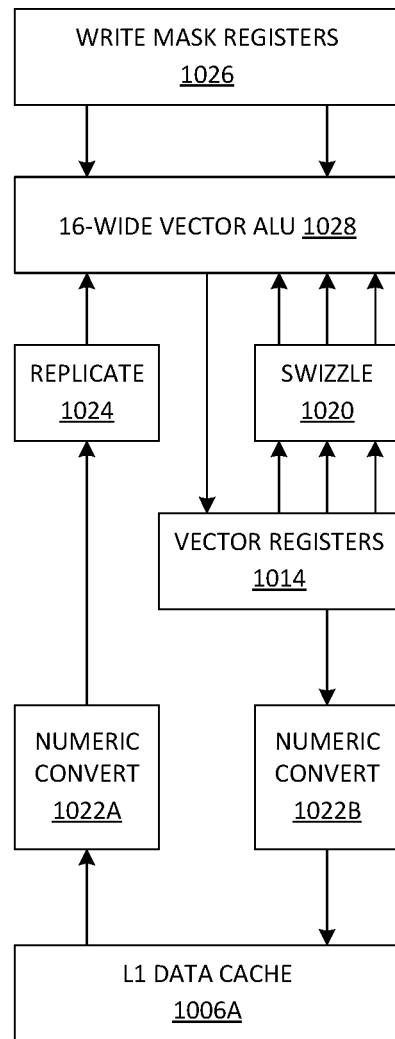

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
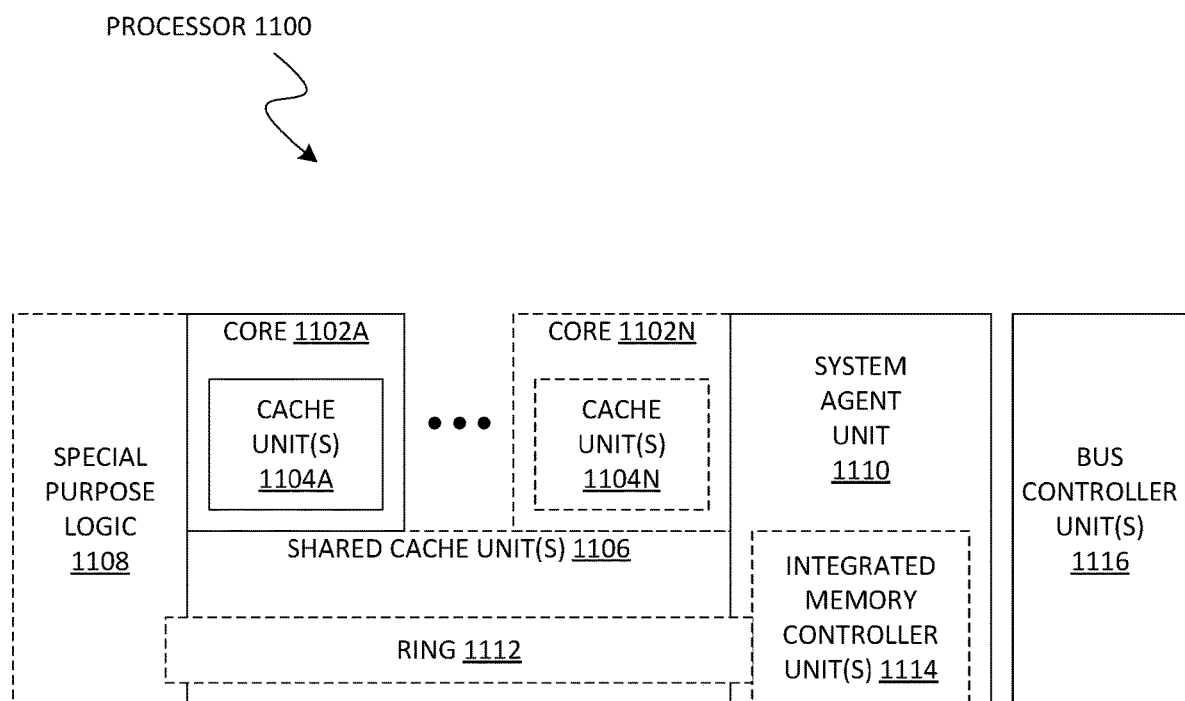
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
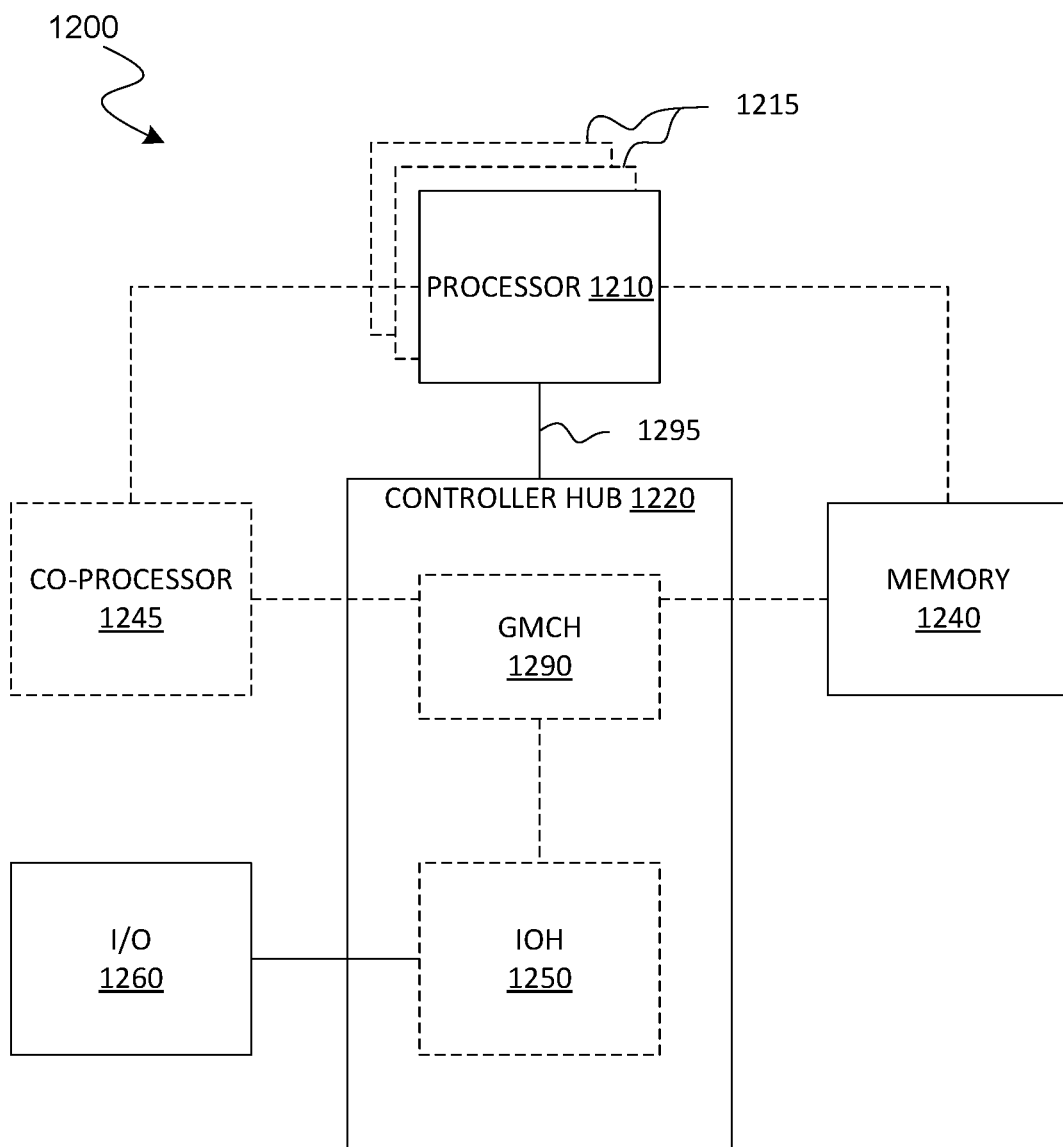
FIGS. 9-12 are block diagrams of exemplary computer architectures.

Referring now to FIG. 9, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
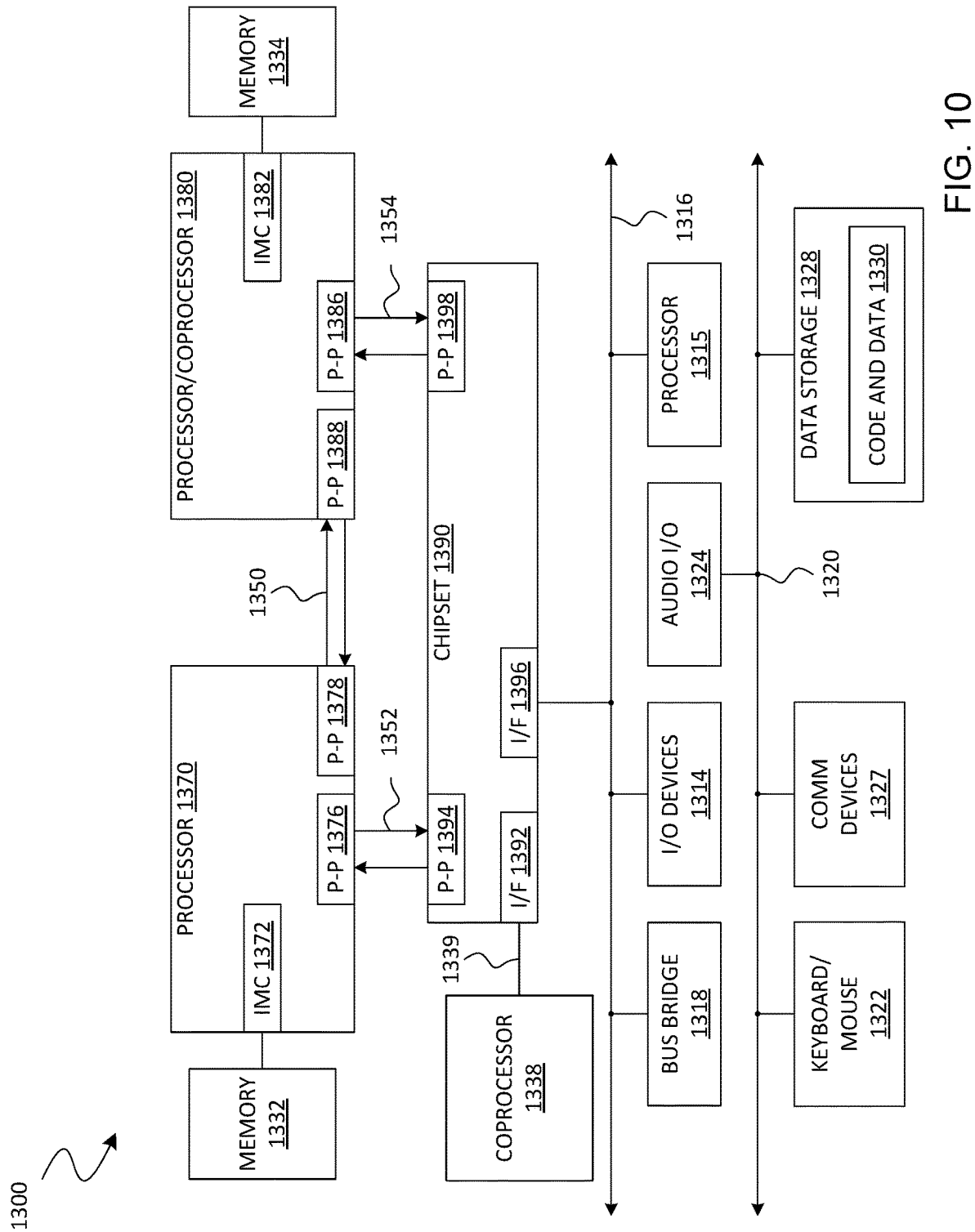

Referring now to FIG. 10, shown is a block diagram of a first more specific exemplary system 1300 in accordance with an embodiment of the present invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

Referring now to FIG. 11, shown is a block diagram of a second more specific exemplary system 1400 in accordance with an embodiment of the present invention Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1472 and 1482, respectively. Thus, the CL 1472, 1482 include integrated memory controller units and include I/O control logic. FIG. 11 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 12, shown is a block diagram of a SoC 1500 in accordance with an embodiment of the present invention. Similar elements in FIG. 8 bear like reference numerals. Also, dashed lined boxes are optional features on more advanced SoCs. In FIG. 12, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 13 shows the program in the high level language 1602 may be compiled using an alternative instruction set compiler 1608 to generate alternative instruction set binary code

1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for ISA opcode parameterization are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Additional Notes and Examples

Example 1 includes an integrated circuit, comprising a core, and a front end unit coupled to the core to decode one or more instruction wherein the front end unit includes a first decode path a second decode path, and circuitry to predict a taken branch of a conditional branch instruction of the one or more instructions decode a predicted path of the taken branch on the first decode path determine if the conditional branch instruction corresponds to a hard-to-predict conditional branch instruction and if the second decode path is available and, if so determined decode an alternate path of a not-taken branch of the hard-to-predict conditional branch instruction on the second decode path.

Example 2 includes the integrated circuit of Example 1, wherein the circuitry is further to decode the alternate path of the hard-to-predict conditional branch instruction on free cycles of the second decode path.

Example 3 includes the integrated circuit of any of Examples 1 to 2, wherein the front end unit further comprises an instruction cache, and wherein the circuitry is further to decode the alternate path of the hard-to-predict conditional branch instruction on the second decode path only if the hard-to-predict conditional branch instruction hits on cache lines in the instruction cache.

Example 4 includes the integrated circuit of any of Examples 1 to 3, wherein the circuitry is further to determine if the one or more instructions includes an instruction set architecture extension to indicate a hard-to-predict conditional branch instruction, and, if so determined determine whether the one or more instructions includes the hard-to-predict conditional branch instruction based on an extension bit of the instruction set architecture extension.

Example 5 includes the integrated circuit of any of Examples 1 to 4, wherein the front end unit further comprises a decode micro-operation cache, and wherein the circuitry is further to assign a set of ways to the decode micro-operation cache reserve a subset of the set of ways for decoded instructions from the alternate path, and capture the decoded instructions from the alternate path in the reserved subset of ways.

Example 6 includes the integrated circuit of Example 5, wherein the circuitry is further to invalidate entries in the reserved subset of ways as soon as the predicted path is determined to be correct.

Example 7 includes the integrated circuit of any of Examples 5 to 6, wherein the circuitry is further to provide the decoded instructions from the reserved subset of ways to a back end unit if the predicted path is determined to be incorrect.

Example 8 includes a method, comprising predicting a taken branch of a conditional branch instruction of one or more instructions decoding a predicted path of the taken branch on a first decode path determining if the conditional branch instruction corresponds to a hard-to-predict conditional branch instruction and if a second decode path is available, and, if so determined decoding an alternate path of a not-taken branch of the hard-to-predict conditional branch instruction on the second decode path.

Example 9 includes the method of Example 8, further comprising decoding the alternate path of the hard-to-predict conditional branch instruction on free cycles of the second decode path.

Example 10 includes the method of any of Examples 8 to 9, further comprising decoding the alternate path of the hard-to-predict conditional branch instruction on the second decode path only if the hard-to-predict conditional branch instruction hits on cache lines in an instruction cache.

Example 11 includes the method of any of Examples 8 to 10, further comprising determining if the one or more instructions includes an instruction set architecture extension to indicate a hard-to-predict conditional branch instruction, and, if so determined determining whether the one or more instructions includes the hard-to-predict conditional branch instruction based on an extension bit of the instruction set architecture extension.

Example 12 includes the method circuit of any of Examples 8 to 11, further comprising assigning a set of ways to a decode micro-operation cache reserving a subset of the set of ways for decoded instructions from the alternate path, and capturing the decoded instructions from the alternate path in the reserved subset of ways.

Example 13 includes the method of Example 12, further comprising invalidating entries in the reserved subset of ways as soon as the predicted path is determined to be correct.

Example 14 includes the method of any of Examples 12 to 13, further comprising providing the decoded instructions from the reserved subset of ways to a back end unit if the predicted path is determined to be incorrect.

Example 15 includes an apparatus, comprising a back end unit to execute one or more decoded instructions, and a front end unit communicatively coupled to the back end unit to decode one or more instructions, the front end unit including a first decode path a second decode path, and circuitry to predict a taken branch of a conditional branch instruction of the one or more instructions decode a predicted path of the taken branch on the first decode path determine if the conditional branch instruction corresponds to a hard-to-predict conditional branch instruction and if the second decode path is available and, if so determined decode an alternate path of a not-taken branch of the hard-to-predict conditional branch instruction on the second decode path.

Example 16 includes the apparatus of Example 15, wherein the circuitry is further to decode the alternate path of the hard-to-predict conditional branch instruction on free cycles of the second decode path.

Example 17 includes the apparatus of any of Examples 15 to 16, wherein the front end unit further comprises an instruction cache, and wherein the circuitry is further to decode the alternate path of the hard-to-predict conditional branch instruction on the second decode path only if the hard-to-predict conditional branch instruction hits on cache lines in the instruction cache.

Example 18 includes the apparatus of any of Examples 15 to 17, wherein the circuitry is further to determine if the one or more instructions includes an instruction set architecture extension to indicate a hard-to-predict conditional branch instruction, and, if so determined determine whether the one or more instructions includes the hard-to-predict conditional branch instruction based on an extension bit of the instruction set architecture extension.

Example 19 includes the apparatus of any of Examples 15 to 18, wherein the front end unit further comprises a decode micro-operation cache, and wherein the circuitry is further to assign a set of ways to the decode micro-operation cache reserve a subset of the set of ways for decoded instructions from the alternate path, and capture the decoded instructions from the alternate path in the reserved subset of ways.

Example 20 includes the apparatus of Example 19, wherein the circuitry is further to invalidate entries in the reserved subset of ways as soon as the predicted path is determined to be correct.

Example 21 includes the apparatus of any of Examples 19 to 20, wherein the circuitry is further to provide the decoded instructions from the reserved subset of ways to the back end unit if the predicted path is determined to be incorrect.

Example 22 includes a front-end apparatus, comprising means for predicting a taken branch of a conditional branch instruction of one or more instructions means for decoding a predicted path of the taken branch on a first decode path means for determining if the conditional branch instruction corresponds to a hard-to-predict conditional branch instruction and if a second decode path is available, and, if so determined means for decoding an alternate path of a not-taken branch of the hard-to-predict conditional branch instruction on the second decode path.

Example 23 includes the apparatus of Example 22, further comprising means for decoding the alternate path of the hard-to-predict conditional branch instruction on free cycles of the second decode path.

Example 24 includes the apparatus of any of Examples 22 to 23, further comprising means for decoding the alternate path of the hard-to-predict conditional branch instruction on the second decode path only if the hard-to-predict conditional branch instruction hits on cache lines in an instruction cache.

Example 25 includes the apparatus of any of Examples 22 to 24, further comprising means for determining if the one or more instructions includes an instruction set architecture extension to indicate a hard-to-predict conditional branch instruction, and, if so determined means for determining whether the one or more instructions includes the hard-to-predict conditional branch instruction based on an extension bit of the instruction set architecture extension.

Example 26 includes the apparatus circuit of any of Examples 22 to 25, further comprising means for assigning a set of ways to a decode micro-operation cache means for reserving a subset of the set of ways for decoded instructions from the alternate path, and means for capturing the decoded instructions from the alternate path in the reserved subset of ways.

Example 27 includes the apparatus of Example 26, further comprising means for invalidating entries in the reserved subset of ways as soon as the predicted path is determined to be correct.

Example 28 includes the apparatus of any of Examples 26 to 27, further comprising means for providing the decoded instructions from the reserved subset of ways to a back end unit if the predicted path is determined to be incorrect.

Example 29 includes at least one non-transitory machine readable medium comprising a plurality of instructions that, in response to being executed on a computing device, cause the computing device to predict a taken branch of a conditional branch instruction of one or more instructions decode a predicted path of the taken branch on a first decode path determine if the conditional branch instruction corresponds to a hard-to-predict conditional branch instruction and if a second decode path is available, and, if so determined decode an alternate path of a not-taken branch of the hard-to-predict conditional branch instruction on the second decode path.

Example 30 includes the at least one non-transitory machine readable medium of Example 29, comprising a plurality of further instructions that, in response to being executed on the computing device, cause the computing device to decode the alternate path of the hard-to-predict conditional branch instruction on free cycles of the second decode path.

Example 31 includes the at least one non-transitory machine readable medium of any of Examples 29 to 30, comprising a plurality of further instructions that, in response to being executed on the computing device, cause the computing device to decode the alternate path of the hard-to-predict conditional branch instruction on the second decode path only if the hard-to-predict conditional branch instruction hits on cache lines in an instruction cache.

Example 32 includes the at least one non-transitory machine readable medium of any of Examples 29 to 31, comprising a plurality of further instructions that, in response to being executed on the computing device, cause the computing device to determine if the one or more instructions includes an instruction set architecture extension to indicate a hard-to-predict conditional branch instruction, and, if so determined determine whether the one or more instructions includes the hard-to-predict conditional branch instruction based on an extension bit of the instruction set architecture extension.

Example 33 includes the at least one non-transitory machine readable medium of any of Examples 29 to 32, comprising a plurality of further instructions that, in response to being executed on the computing device, cause the computing device to assign a set of ways to a decode micro-operation cache reserve a subset of the set of ways for decoded instructions from the alternate path, and capture the decoded instructions from the alternate path in the reserved subset of ways.

Example 34 includes the at least one non-transitory machine readable medium of Example 33, comprising a plurality of further instructions that, in response to being executed on the computing device, cause the computing device to invalidate entries in the reserved subset of ways as soon as the predicted path is determined to be correct.

Example 35 includes the at least one non-transitory machine readable medium of any of Examples 33 to 34, comprising a plurality of further instructions that, in response to being executed on the computing device, cause the computing device to provide the decoded instructions from the reserved subset of ways to a back end unit if the predicted path is determined to be incorrect.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
    a back end execution unit; and
    a front end unit coupled to the back end execution unit to decode one or more instruction wherein the front end unit includes:
        a first decode path;
        a second decode path;
        a decode micro-operation cache; and
        circuitry to:
            predict a taken branch of a conditional branch instruction of the one or more instructions;
            decode a predicted path of the taken branch on the first decode path;
            perform an evaluation to detect a condition comprising both:
                an availability of free cycles of the second decode path; and
                a correspondence of the conditional branch instruction to a hard-to-predict conditional branch instruction;
            in response to a detection of the condition by the evaluation, opportunistically decode an alternate path of a not-taken branch of the hard-to-predict conditional branch instruction on the second decode path;
            assign a set of ways to the decode micro-operation cache;
            reserve a subset of the set of ways for decoded instructions from the alternate path; and
            capture the decoded instructions from the alternate path in the reserved subset of ways.

2. The integrated circuit of claim 1, wherein the circuitry is to opportunistically decode the alternate path of the hard-to-predict conditional branch instruction on the free cycles of the second decode path.

3. The integrated circuit of claim 1, wherein the front end unit further comprises an instruction cache, and wherein the circuitry is to opportunistically decode the alternate path of the hard-to-predict conditional branch instruction on the second decode path only if the hard-to-predict conditional branch instruction hits on cache lines in the instruction cache.

4. The integrated circuit of claim 1, wherein the circuitry to perform the evaluation to detect the condition comprises the circuitry to:
    determine if the one or more instructions includes an instruction set architecture extension to indicate a hard-to-predict conditional branch instruction; and, if so determined,
    determine whether the one or more instructions includes the hard-to-predict conditional branch instruction based on an extension bit of the instruction set architecture extension.

5. The integrated circuit of claim 1, wherein the circuitry is further to:
    invalidate entries in the reserved subset of ways as soon as the predicted path is determined to be correct.

6. The integrated circuit of claim 1, wherein the circuitry is further to:

provide the decoded instructions from the reserved subset of ways to a back end execution unit if the predicted path is determined to be incorrect.

7. A method, comprising:
predicting a taken branch of a conditional branch instruction of one or more instructions;
decoding a predicted path of the taken branch on a first decode path;
performing an evaluation to detect a condition comprising both:
an availability of free cycles of a second decode path; and
a correspondence of the conditional branch instruction to a hard-to-predict conditional branch instruction;
in response to a detection of the condition by the evaluation, opportunistically decoding an alternate path of a not-taken branch of the hard-to-predict conditional branch instruction on the second decode path;
assigning a set of ways to a decode micro-operation cache;
reserving a subset of the set of ways for decoded instructions from the alternate path; and
capturing the decoded instructions from the alternate path in the reserved subset of ways.

8. The method of claim 7, wherein the alternate path of the hard-to-predict conditional branch instruction is opportunistically decoded on the free cycles of the second decode path.

9. The method of claim 7, wherein the alternate path of the hard-to-predict conditional branch instruction is opportunistically decoded on the second decode path only if the hard-to-predict conditional branch instruction hits on cache lines in an instruction cache.

10. The method of claim 7, wherein performing the evaluation to detect the condition comprises:
determining if the one or more instructions includes an instruction set architecture extension to indicate a hard-to-predict conditional branch instruction; and, if so determined,
determining whether the one or more instructions includes the hard-to-predict conditional branch instruction based on an extension bit of the instruction set architecture extension.

11. The method of claim 7, further comprising:
invalidating entries in the reserved subset of ways as soon as the predicted path is determined to be correct.

12. The method of claim 7, further comprising:
providing the decoded instructions from the reserved subset of ways to a back end execution unit if the predicted path is determined to be incorrect.

13. An apparatus, comprising:
a back end unit to execute one or more decoded instructions; and
a front end unit communicatively coupled to the back end unit to decode one or more instructions, the front end unit including:
a first decode path;
a second decode path;
a decode micro-operation cache; and
circuitry to:
predict a taken branch of a conditional branch instruction of the one or more instructions;
decode a predicted path of the taken branch on the first decode path;
perform an evaluation to detect a condition comprising both:
an availability of free cycles of the second decode path; and
a correspondence of the conditional branch instruction to a hard-to-predict conditional branch instruction;
in response to a detection of the condition by the evaluation, opportunistically decode an alternate path of a not-taken branch of the hard-to-predict conditional branch instruction on the second decode path;
assign a set of ways to the decode micro-operation cache;
reserve a subset of the set of ways for decoded instructions from the alternate path; and
capture the decoded instructions from the alternate path in the reserved subset of ways.

14. The apparatus of claim 13, wherein the circuitry is to opportunistically decode the alternate path of the hard-to-predict conditional branch instruction on the free cycles of the second decode path.

15. The apparatus of claim 13, wherein the front end unit further comprises an instruction cache, and wherein the circuitry is to opportunistically decode the alternate path of the hard-to-predict conditional branch instruction on the second decode path only if the hard-to-predict conditional branch instruction hits on cache lines in the instruction cache.

16. The apparatus of claim 13, wherein the circuitry to perform the evaluation to detect the condition comprises the circuitry to:
determine if the one or more instructions includes an instruction set architecture extension to indicate a hard-to-predict conditional branch instruction; and, if so determined,
determine whether the one or more instructions includes the hard-to-predict conditional branch instruction based on an extension bit of the instruction set architecture extension.

17. The apparatus of claim 13, wherein the circuitry is further to:
invalidate entries in the reserved subset of ways as soon as the predicted path is determined to be correct.

18. The apparatus of claim 13, wherein the circuitry is further to:
provide the decoded instructions from the reserved subset of ways to the back end unit if the predicted path is determined to be incorrect.

* * * * *